US010273562B2

(12) United States Patent
Dreisinger et al.

(10) Patent No.: US 10,273,562 B2
(45) Date of Patent: Apr. 30, 2019

(54) ACID LEACHING OF RARE EARTH MINERALS

(71) Applicant: Search Minerals Inc., North Vancouver (CA)

(72) Inventors: David Dreisinger, North Vancouver (CA); Cornelis Verbaan, North Vancouver (CA)

(73) Assignee: Search Minerals Inc., North Vancouver (CA)

( * ) Notice: Subject to any disclaimer, the term of this patent is extended or adjusted under 35 U.S.C. 154(b) by 129 days.

(21) Appl. No.: 15/327,694

(22) PCT Filed: Jun. 30, 2015

(86) PCT No.: PCT/CA2015/050611
§ 371 (c)(1),
(2) Date: Jan. 20, 2017

(87) PCT Pub. No.: WO2016/011540
PCT Pub. Date: Jan. 28, 2016

(65) Prior Publication Data
US 2017/0204499 A1 Jul. 20, 2017

Related U.S. Application Data

(60) Provisional application No. 62/026,861, filed on Jul. 21, 2014.

(51) Int. Cl.
C22B 59/00 (2006.01)
C22B 1/00 (2006.01)
C22B 3/08 (2006.01)
C22B 3/46 (2006.01)
(Continued)

(52) U.S. Cl.
CPC ............... *C22B 59/00* (2013.01); *C22B 1/00* (2013.01); *C22B 3/08* (2013.01); *C22B 3/46* (2013.01); *Y02P 10/234* (2015.11)

(58) Field of Classification Search
CPC ......... Y02P 10/234; C22B 59/00; C22B 1/00; C22B 3/08; C22B 3/46; C22B 60/02; C01F 15/00; C01F 17/005; C01G 49/009
(Continued)

(56) References Cited

U.S. PATENT DOCUMENTS

2014/0341790 A1* 11/2014 Kasaini ................ C22B 3/44
423/18

FOREIGN PATENT DOCUMENTS

CA 2025151 * 3/1991
CN 1721559 1/2006
(Continued)

OTHER PUBLICATIONS

Topkaya et al "Acid curing and baking of bastnaesite ore and concentrate" Materials Science Forum, vols. 315-317, pp. 530-536. (Year: 1999).*
(Continued)

*Primary Examiner* — Steven J Bos
(74) *Attorney, Agent, or Firm* — Casimir Jones, S.C.; Jason R. Bond (57) ABSTRACT

The invention provides hydrometallurgical processes for the recovery of rare earth values from ore, using simple crushing without beneficiation to produce an enriched and purified mixed rare earth concentrate. Ore is crushed to a relatively coarse particle size, and then treated with relatively small amounts of acid, at a relatively modest elevated temperature, to render the rare earth elements extractable in a subsequent water leach.

25 Claims, 4 Drawing Sheets

(58) Field of Classification Search
USPC .................................. 423/21.1, 263, 11, 18
See application file for complete search history.

(56) References Cited

FOREIGN PATENT DOCUMENTS

| | | | |
|---|---|---|---|
| CN | 101492771 | * | 7/2009 |
| CN | 102230082 | | 11/2011 |

OTHER PUBLICATIONS

Srivastava et al Technical report on the Foxtrot project in Labrador, New Foundland & Labrador, Canada (NI 43-101 Report), 2012. (Year: 2012).*
ISR for PCT/CA 2015/050611, dated Oct. 2015. (Year: 2015).*
Srivastava et al., Technical Report on the Foxtrot Project in Labrador, Newfoundland & Labrador, Canada, NI 43-101 Report, May 9, 2013, 49 pages.
Dreisinger et al., The Processing of REEs From Search Minerals' Foxtrot Resource. Rare Earths 2012. Proceedings of the $51^{st}$ Annual Conference of Metallurgists of CIM (COM 2012). Eds. Goode, Moldoveanu, Rayat. Niagra, ON, Canada, pp. 81-94.
Dreisinger et al., The Processing of REEs From Search Minerals' Foxtrot Resource. Presentation Slides. Rare Earths 2012. Proceedings of the $51^{st}$ Annual Conference of Metallurgists of CIM (COM 2012). Niagra, ON, Canada, 32 pages.
Xie et al., A critical review on solvent extraction of rare earths from aqueous solutions. Minerals Engineering 2014;56:10-28.

* cited by examiner

ACID LEACHING OF RARE EARTH MINERALS

FIELD OF THE INVENTION

The invention is in the field of rare earth element hydrometallurgy.

BACKGROUND OF THE INVENTION

The rare earth elements are the series of elements that extends from lanthanum to lutetium on the periodic table. Yttrium and scandium are sometimes included in the rare earth element grouping. These elements are very valuable and in some cases in short supply.

The processing of rare earths is dominated by China. The history of rare earth extraction is well documented in a textbook "Extractive Metallurgy of Rare Earths", by C. K. Gupta (Author), N. Krishnamurthy CRC Press (2004). Two of the major deposits of rare earths are the Bayan Obo deposit in China and the Mountain Pass deposit in California. These deposits contain bastnasite as the major rare earth mineral. The percentage of the total rare earth content of the bastnasite ores contained as individual rare earth elements is dominated by the light rare earths (La, Ce, Pr, Nd, Sm) with low content of heavy rare earths (Eu—Lu, Y).

The recovery of rare earths from mineral deposits is complicated and costly. For example at both Bayan Obo and Mountain Pass, the ore is crushed and ground to fine size (150 mesh or 104 micrometers in diameter) and then subjected to a complicated physical and chemical separation process. The finely ground Mountain Pass ore (Gupta and Krishnamurthy) has historically been treated with 6 stages of conditioning with chemicals such as soda ash, fluorosilicate, distilled tall oil, ammonium lignin sulfonate and steam for heating, followed by froth flotation to make a mineral concentrate. The mineral concentrate is then subjected to chemical steps (acid washing) and high temperature calcination before refining. A similar process has been applied at Bayan Obo with the addition of steps of magnetic separation and gravity concentration (separation based on differential magnetic properties) to produce a mineral concentrate.

The mineral concentrate produced by beneficiation is then typically chemically attacked using acid (eg. sulfuric acid) or base (eg. sodium hydroxide) to decompose the rare earth minerals and allow subsequent extraction to an aqueous solution. The extracted rare earths may then be purified by various chemical methods. Finally rare earths may be separated by the process of multi-stage solvent extraction to produce individual rare earth elements of high purity for commercial use. The process of solvent extraction is for example reviewed in: Xie, F., Ting, T. Z., Dreisinger, D. B., Doyle, F., "A Critical Review on Solvent Extraction of Rare Earths from Aqueous Solutions", Minerals Engineering (2014), 56, 10-28.

Additional aspects of selected rare earth extraction methods are described in: Dreisinger et al., "The Processing of REE's from Search Minerals Foxtrot Resource", Proceedings of Rare Earths 2012, Eds, J. R. Goode, G. Moldoveanu, M. S. Reyat, CIM Metsoc (Montreal), 81-94. This paper outlines a process of beneficiation to produce a mineral concentrate. The techniques of gravity, flotation and magnetic separation are used to upgrade a rare earth ore containing various rare earth minerals. The finely ground concentrate is then acid treated to convert the rare earth minerals to acid soluble form. The rare earth sulfates are then water leached. The leachate is then purified and the rare earth elements recovered by an oxalate precipitation process.

SUMMARY OF THE INVENTION

Aspects of the invention simplify the recovery process for rare earths, providing surprising yields using simple crushing without beneficiation, employing chemical extraction and purification to produce a rare earth concentrate. In this process, the ore is crushed to relatively coarse particle size and then contacted with relatively small amounts of acid to render the rare earth elements extractable in a subsequent water leach. In effect, the crushed ore is subjected to pre-treatment with acid at a relatively modest temperature to pre-react the rare earth minerals to make the REEs soluble in the subsequent water leach.

In select embodiments, the water leachate is treated by a series of purification and precipitation steps to produce a high purity mixed rare earth oxide for refining using solvent extraction technology. An exemplary process of purification uses pH adjustment steps, for example with MgO, $MgCO_3$ or $Na_2CO_3$ to remove thorium and iron from solution, along with other minor impurity elements. In alternative embodiments, uranium may be removed from the water leach solution by ion exchange.

The purified solution may then be treated with soda ash to precipitate an impure rare earth carbonate. The rare earth carbonate may then be dissolved in hydrochloric acid (or another acid) and the pH adjusted again to precipitate small amounts of remaining iron and thorium. The purified hydrochloric acid leach solution may then be treated with oxalic acid to precipitate all the rare earths as a mixed rare earth oxalate product. In alternative embodiments, a two stage precipitation is provided from the chloride releach solution. Two stage precipitation may be carried out so as to facilitate the recovery of: (a) a high purity initial precipitate containing for example at least 90% of the rare earths and (b) a lower purity second precipitate for recycling. The second precipitate may for example be a carbonate precipitate, which may be returned directly to the releach process with a mineral acid, such as HCl, $H_2SO_4$ or $HNO_3$.

The mixed rare earth oxalate may be calcined to form a mixed rare earth oxide. This product may then go to a rare earth refinery. At the rare earth refinery, the mixed rare earth oxide may be redissolved in acid (for example HCl or $HNO_3$) and then separated by a process of multi-stage solvent extraction.

DETAILED DESCRIPTION OF THE INVENTION

Characteristics of a simple direct leaching process are described herein for treatment of rare earth element ores. In select aspects, as described in more detail below, the process involves crushing, for example to approximately 6, 7, 8, 9 or 10 mesh particle size, application of 50-150, or approximately 100 kg/t of $H_2SO_4$ to the ore at 100° C.-300° C., for example approximately 200° C., for 1-3 hours, for example approximately 2 hours, followed by a water leach, for example for at least 5, 10, 15, 20 or 24 hours, to produce a weakly acidic product leach solution. The acid treatment operation may for example be carried out in a heated pug mill arrangement, a relatively small reactor with a screw conveyor pushing the acid treated material through the mill. The heated pub mill arrangement may for example include a plurality of successive heated pug mills, for example 2 or 3 heated pug mills. The screw or screws in the pug mill arrangement can be heated to heat the contents of the mill to the target temperature. Alternative steps, for example within the context of the pug mill arrangement may for example include steps of ore/acid mixing, heating in a dryer reactor, such as a Holoflite filter (a heated dryer in which the ore/acid material is pushed through horizontal tubes), holding or "soaking" in an insulated hopper to allow the acid further time to react at temperature with the ore and render additional rare earth elements soluble in the subsequent water leach.

After oxidation and pH adjustment of the weakly acidic product solution with an alkali, such as MgO, NaOH, $Na_2CO_3$, $NH_3$, $NH_4OH$, $NaHCO_3$ or $MgCO_3$ slurry, to precipitate and separate the bulk of the iron and thorium from the solution, sodium carbonate is added to precipitate a mixed carbonate rare earth product. The mixed carbonate is then re-leached with acid, for example HCl, $HNO_3$ or $H_2SO_4$ at pH 1 or less, to produce a strong rare earth chloride solution. The pH is again increased with alkali, such as MgO, NaOH, $Na_2CO_3$, $NH_3$, $NH_4OH$ or NaHCO3, to reject small amounts of thorium and other impurities. The rare earths may be re-precipitated with oxalic acid addition to produce a high quality mixed rare earth oxalate for calcination. The oxalate precipitate may then be calcined, for example at 750° C., to produce a high quality mixed rare earth oxide product for refining. This product may be re-leached at a refinery with acid, such as HCl, $HNO_3$ or $H_2SO_4$, to produce a high strength solution for rare earth separation by multi-stage solvent extraction processing.

Figure 1:
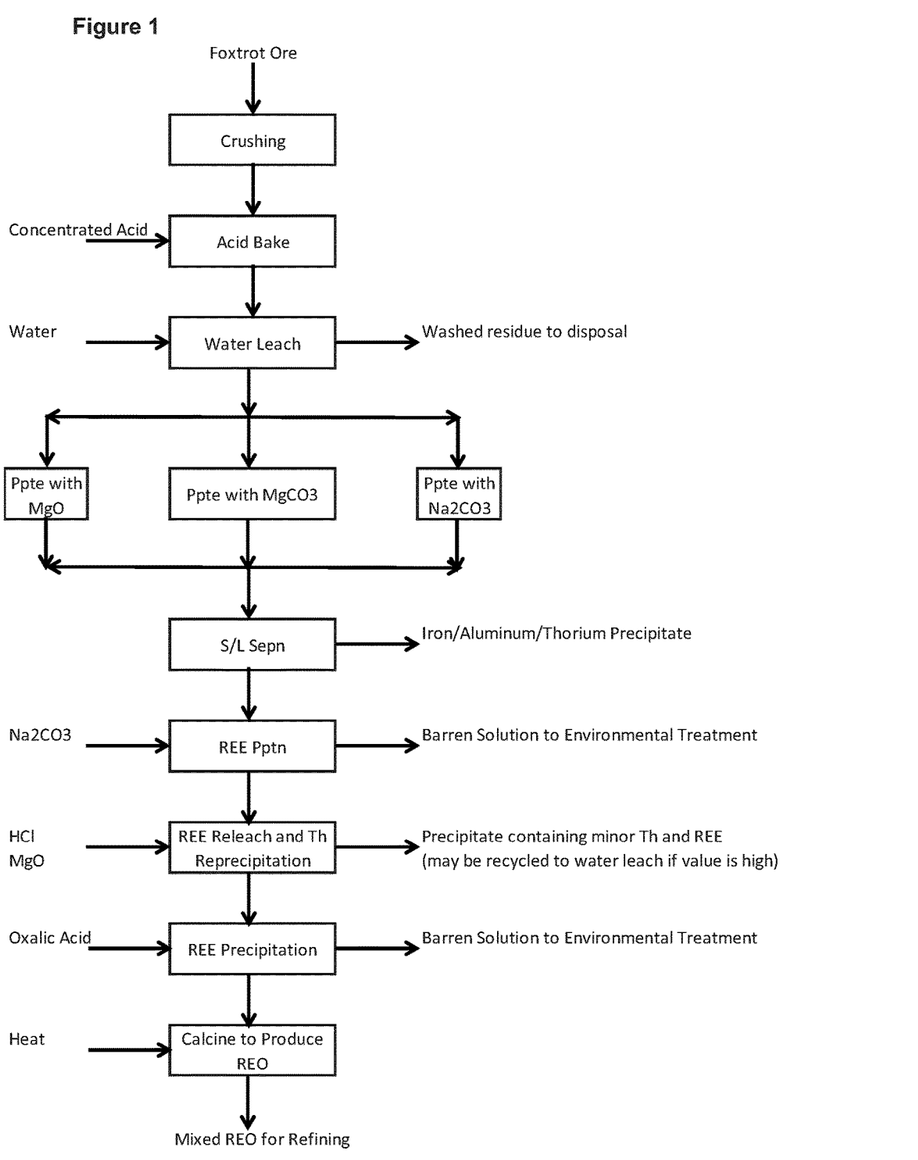
FIG. 1 is a conceptual flowsheet illustrating aspects of processes of the invention.

In an exemplary embodiment, an ore for treatment was sourced from the Foxtrot Deposit within the Port Hope Simpson REE District in Labrador, Canada (Srivastava et al, 2013). The direct treatment of Foxtrot ore was illustrated through a series of studies on acid treatment/water leaching, solution purification, RE precipitation, RE re-dissolution and purification to remove thorium and finally RE precipitation with oxalic acid and calcination to make a mixed REO. The general flowsheet for the treatment scheme is shown in FIG. 1.

The recovered rare earth elements may for example comprise at least 2, 3, 4, 5, 6, 7, 8, 9, 10, 11, 12, 13, 14 or all of: La, Ce, Pr, Nd, Sm, Eu, Gd, Tb, Dy, Ho, Y, Er, Tm, Yb and Lu. In selected embodiments, The overall recovery of La, Ce, Pr, Nd, Sm, Eu, Gd, Tb, Dy, Ho, Y or Er may for example be at least about 70%. The overall recovery of Tm may for example be at last about 65%. The overall recovery of Yb may for example be at least about 60%. The overall recovery of Lu may for example be at least about 50%.

Acid Treatment and Water Leaching

Figure 2:
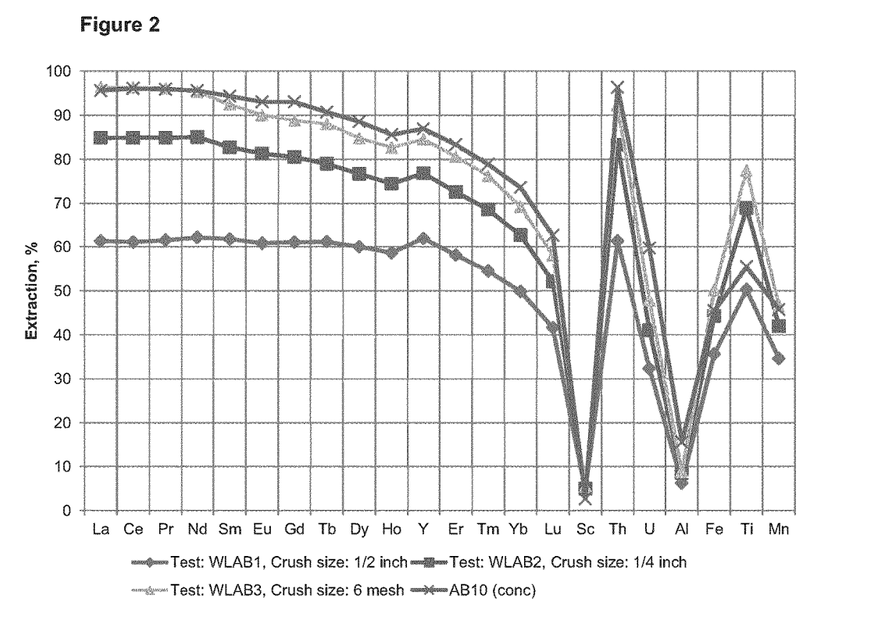
FIG. 2 is a graph illustrating extraction results for acid treated and water leach tests using various crush sizes, under conditions of: acid treatment at 200° C. and 1500 kg $H_2SO_4$/t for 4 h followed by 24 water leach.

FIG. 2 shows results illustrating the impact of crush size. The ore was treated with 1500 kg/t of $H_2SO_4$ for 4 hours at 200° C. and then water leached for 24 hours to extract rare earths (RE's) into solution. The extraction of RE's from the 6 mesh material was almost the same as the original concentrate (also shown on the graph). The direct extraction of the light RE's approaches 95%.

Figure 3:
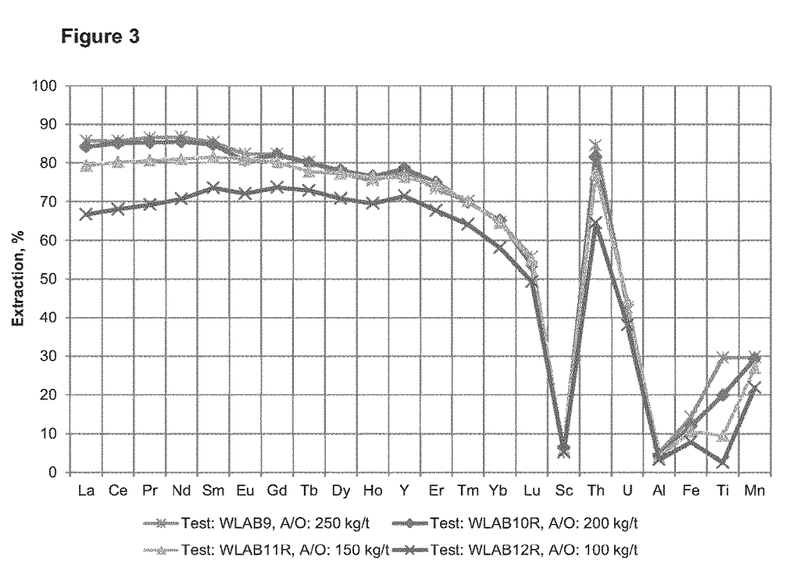
FIG. 3 is a graph illustrating extraction results for acid treated 6 and water leach embodiments using various acid additions, under conditions of: acid treatment at 200° C. of 6 mesh material for 2 h followed by 24 water leach.

The impact of acid addition is illustrated in FIG. 3. At acid additions in the range of 100-250 kg $H_2SO_4$/t, the RE extractions were still as high as ~85% for the light RE's.

Embodiments were tested that illustrated the benefits of "rabbling" of the ore/acid mixture during the acid treatment test. This rabbling enhanced the contact between acid and ore and promoted higher extraction. Similarly the impact of stirring speed and time indicated that better extraction was promoted by faster stirring and longer times for water leaching.

A number of illustrative embodiments were exemplified with 1 kg charges to acid treatment, to confirm extractions and produce a larger volume of water leach solution for processing. The material is coarse (6 mesh) and "dry" in appearance both before and after the acid treatment. Leach results are shown in Table 1.

TABLE 1

Bulk Acid Treatment and Water Leach Results. Conditions: Acid Treatment at 6 mesh, 200° C., 2 hours and 24 h Water Leach at 90° C. with 600 rpm mixing intensity.

| Element | Units | Feed | PLS | Residue | Extraction |
|---|---|---|---|---|---|
| | | Assay (mg/L, %, g/t) | | | % |
| La | g/t | 1720 | 144 | 392 | 76.7 |
| Ce | | 3720 | 321 | 805 | 78.1 |
| Pr | | 437 | 39.7 | 90.8 | 79.6 |
| Nd | | 1610 | 148 | 330 | 80.0 |
| Sm | | 297 | 27.9 | 63.8 | 79.6 |
| Eu | | 15.5 | 1.51 | 3.6 | 79.1 |
| Gd | | 244 | 22.6 | 56.1 | 78.4 |
| Tb | | 37.3 | 3.59 | 8.5 | 79.2 |
| Dy | | 223 | 20.8 | 54.6 | 77.5 |
| Ho | | 43.7 | 4.09 | 11.7 | 76.0 |
| Y | | 1090 | 107 | 288 | 77.0 |
| Er | | 122 | 11.2 | 36 | 73.8 |
| Tm | | 17.2 | 1.49 | 5.8 | 69.9 |
| Yb | | 111 | 8.56 | 41.8 | 64.9 |
| Lu | | 15.8 | 1.02 | 7.3 | 55.9 |
| Sc | | 25 | 0.07 | 25 | 4.7 |
| Th | | 109 | 9.35 | 34.6 | 70.4 |
| U | | 22.4 | 1.2 | 13.5 | 44.4 |
| Si | % | 31.32 | 288 | 32.44 | 0.8 |
| Al | | 3.99 | 212 | 3.97 | 4.6 |
| Fe | | 7.83 | 496 | 7.69 | 5.5 |
| Mg | | 0.12 | 43.5 | 0.07 | 36.7 |
| Ca | | 1.45 | 642 | 0.96 | 40.0 |
| Na | | 2.13 | 47 | 2.14 | 2.6 |
| K | | 3.36 | 384 | 3.44 | 9.2 |
| Ti | | 0.27 | 4.6 | 0.28 | 1.5 |
| P | | 0.01 | 5 | 0.02 | 33.5 |
| Mn | | 0.23 | 82.3 | 0.19 | 27.6 |

Figure 4:
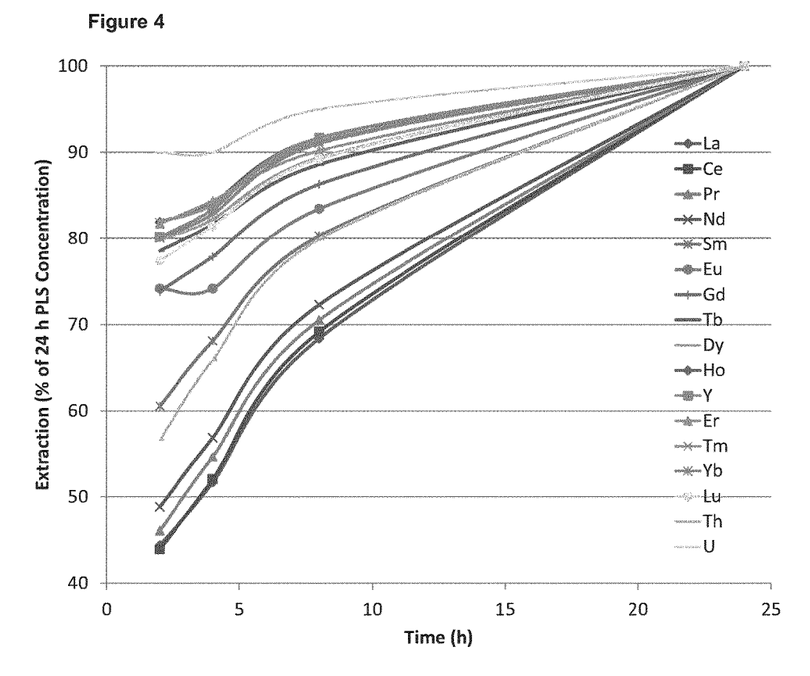
FIG. 4 is a graph illustrating water leach extraction of rare earth elements with time.

The average extraction was 78% for the series La—Er. The extractions of Tm—Lu were lower. The radioactive elements Th and U were extracted but the major gangue elements (Si, Al, Fe, Na, K) were weakly extracted. Some Mg, Ca, Ti, P, Mn were also extracted. FIG. 4 shows the extraction of the REE's and Th and U with time, illustrating that the LREEs (eg. La, Ce, Pr, Nd) are extracted more slowly than the HREEs.

Impurity Removal by Oxidation and Precipitation

The initial removal of impurities was illustrated by pH adjustment and oxidation (for Fe removal). Three alkalis were exemplified, including MgO, $MgCO_3$ and $Na_2CO_3$. For each example, the removal of impurities appeared to be maximized with minimum rare earth loss due to co-precipitation. All three alkalis were successful. Magnesium carbonate ($MgCO_3$) was selected for a bulk impurity removal test. A volume of ~13 L of water leach solution was prepared and heated to 75° C. and treated with ~0.5 g/L of $H_2O_2$ to raise the ORP to +600 mV (vs Ag/AgCl). The pH was then adjusted to 3.75 with a 15% solid slurry of $MgCO_3$ and held for 1 h. The impurity precipitates were filtered and washed. The results are summarized in Table 2. More than 90% of the iron was eliminated along with 88.4% of the thorium. There was also significant rejection of Si, Al, Ti and P. The losses of REEs ranged from 0.74 to 3.6% from La to Lu. Note that the final precipitate was analyzed at 0.018% Mg indicating a high efficiency of $MgCO_3$ use.

TABLE 2

Impurity Removal Results. Conditions: pH 3.75 with $MgCO_3$ addition for 1 h at 75° C.

| Element | Units | PLS | Product Solution | Precipitate | PPT % |
|---|---|---|---|---|---|
| | | | Assay (mg/L, %, g/t) | | |
| La | g/t | 141 | 145 | 643 | 0.74 |
| Ce | | 314 | 324 | 1960 | 1.01 |
| Pr | | 39.4 | 40.2 | 286 | 1.19 |
| Nd | | 147 | 152 | 1120 | 1.23 |
| Sm | | 27.8 | 28.9 | 254 | 1.46 |
| Eu | | 1.5 | 1.54 | 13.2 | 1.43 |
| Gd | | 21.9 | 22.5 | 210 | 1.55 |
| Tb | | 3.55 | 3.55 | 37.6 | 1.76 |
| Dy | | 20.7 | 20.9 | 224 | 1.78 |
| Ho | | 4.08 | 4.1 | 45.4 | 1.84 |
| Y | | 104 | 106 | 875 | 1.38 |
| Er | | 11.1 | 11.1 | 156 | 2.32 |
| Tm | | 1.51 | 1.49 | 26.7 | 2.94 |
| Yb | | 8.51 | 8.34 | 185 | 3.61 |
| Lu | | 1.01 | 0.99 | 21.8 | 3.58 |
| Sc | | 0.07 | 0.07 | 25 | 36.95 |
| Th | | 9.43 | 1.07 | 4810 | 88.41 |
| U | | 1.21 | 1.15 | 36.5 | 5.09 |
| Si | % | 279 | 202 | 5.10 | 29.89 |
| Al | | 201 | 99.1 | 6.35 | 51.82 |
| Fe | | 619 | 48.5 | 30.78 | 91.48 |
| Mg | | 35.7 | 1690 | 0.018 | 0.02 |
| Ca | | 602 | 649 | 0.021 | 0.06 |
| Na | | 28 | 30 | 0.015 | 0.83 |
| K | | 238 | 259 | 0.017 | 0.11 |
| Ti | | 5.68 | 0.07 | 0.336 | 98.78 |
| P | | 5 | 5 | 0.083 | 21.39 |
| Mn | | 76.2 | 80.8 | 0.008 | 0.16 |

TABLE 3

REE Precipitation Results. Conditions: pH 7.25 with $Na_2CO_3$ addition for 3 h at 25° C.

| Element | | Feed Solution | Product Solution | Precipitate | PPT % |
|---|---|---|---|---|---|
| | | | Assay (mg/L, %, g/t) | | |
| La | g/t | 134 | 0.24 | 57700 | 99.8 |
| Ce | | 315 | 0.39 | 129000 | 99.9 |
| Pr | | 36.3 | 0.06 | 15600 | 99.8 |
| Nd | | 136 | 0.18 | 58800 | 99.9 |
| Sm | | 26.1 | 0.05 | 11000 | 99.8 |
| Eu | | 1.39 | 0.03 | 584 | 97.6 |
| Gd | | 23 | 0.04 | 10900 | 99.8 |
| Tb | | 3.62 | 0.03 | 1640 | 99.1 |
| Dy | | 20.8 | 0.05 | 9270 | 99.7 |
| Ho | | 4.08 | 0.02 | 1800 | 99.5 |
| Y | | 107 | 0.3 | 42100 | 99.7 |
| Er | | 11.1 | 0.04 | 4880 | 99.6 |
| Tm | | 1.46 | 0.04 | 636 | 97.1 |
| Yb | | 7.92 | 0.03 | 3470 | 99.6 |
| Lu | | 0.93 | 0.03 | 409 | 96.6 |
| Sc | | 0.07 | 0.07 | 40 | 54.5 |
| Th | | 0.85 | 0.04 | 422 | 95.7 |
| U | | 1.07 | 0.13 | 467 | 88.4 |
| Al | | 83.6 | 0.5 | 3.67 | 99.4 |
| Fe | | 39.3 | 0.2 | 1.81 | 99.5 |
| Mg | | 1550 | 1560 | 0.505 | 0.7 |
| Ca | | 616 | 583 | 1.95 | 6.6 |
| Na | | 191 | 1050 | 0.125 | 0.3 |
| K | | 298 | 289 | 0.3 | 2.2 |
| P | | 5 | 5 | 0.003 | 1.2 |
| Mn | | 77.4 | 68.8 | 0.131 | 3.9 |

TABLE 4

Overall Recovery (%) of Rare Earth Elements from Foxtrot Ore to Mixed Carbonate Precipitate.

| La | Ce | Pr | Nd | Sm | Eu | Gd | Tb | Dy | Ho | Y | Er | Tm | Yb | Lu |
|---|---|---|---|---|---|---|---|---|---|---|---|---|---|---|
| 75.9 | 77.3 | 78.9 | 79.3 | 78.9 | 78.4 | 77.6 | 78.4 | 76.7 | 75.3 | 76.3 | 73.1 | 69.2 | 64.3 | 55.4 |

Bulk Rare Earth Precipitation

The purified solution was treated with soda ash solution ($Na_2CO_3$) to precipitate the REEs into a mixed carbonate product for further purification. A pH target of 7.25 at ambient temperature was set. The results are shown in Table 3. The precipitation of REEs approaches 100%. The co-precipitation of Th, U, Fe, Al is similarly very high. The mixed REE carbonate precipitate may be further refined by a re-leach, oxalate precipitation and calcination method to form a mixed REO for refining. The overall recovery of REEs from ore to mixed carbonate precipitate has been calculated and summarized in Table 4.

Mixed Carbonate Re-Leach, Thorium Removal, REE Oxalate Precipitation and Calcination The mixed carbonate product was re-leached with 37% HCl solution at pH 1 for 1 hour at 80° C. The chloride leach solution was then treated with 15% slurry of MgO in deionized water to pH 3.8 at 50° C. for 1 h to reprecipitate re-leached thorium. The re-leach process was virtually 100% effective in re-dissolving the REEs. The re-leach residue and the thorium removal residue would be returned to the water leach process to minimize any REE loss. The low-thorium solution was then treated with oxalic acid to selectively precipitate the REEs. The rare earth oxalate was then calcined at 750° C. for 4 h to produce a final mixed rare earth product. The assay of the rare earth oxalate and the calcined rare earth oxalate are shown below, in Table 5.

TABLE 5

Chemical Analysis of the Rare Earth Oxalate and Rare Earth Calcine Products

| Element | | RE Oxalate ICP | RE Calcine ICP | RE Calcine XRF |
|---|---|---|---|---|
| | | Assay (%, g/t) | | |
| La | g/t | 58900 | 110000 | 125000 |
| Ce | g/t | 135000 | 250000 | 284000 |
| Pr | g/t | 16000 | 29500 | 32300 |
| Nd | g/t | 64900 | 119000 | 131000 |
| Sm | g/t | 10800 | 19900 | 18900 |
| Eu | g/t | 573 | 1060 | |
| Gd | g/t | 10200 | 18300 | |
| Tb | g/t | 1570 | 2820 | |
| Dy | g/t | 8850 | 16100 | |
| Ho | g/t | 1730 | 3180 | |
| Y | g/t | 39500 | 75600 | 78900 |
| Er | g/t | 4670 | 8560 | |
| Tm | g/t | 590 | 1070 | |
| Yb | g/t | 2910 | 5350 | |
| Lu | g/t | 348 | 629 | |
| Sc | g/t | <50 | <50 | |
| Th | g/t | 3.6 | 6.5 | <100 |
| U | g/t | 21.1 | 48.5 | |
| Si | g/t | | | <5 |
| Al | g/t | 146 | <2000 | <100 |
| Fe | g/t | 9 | 744 | |
| Mg | g/t | 201 | 316 | 60 |
| Ca | g/t | 1480 | <2000 | 2600 |
| Na | g/t | <400 | <1000 | |
| K | g/t | <2000 | <2000 | 700 |
| Ti | g/t | <30 | <40 | <100 |
| P | g/t | <30 | <3000 | <40 |
| Mn | g/t | <9 | 64 | <100 |
| Zn | g/t | 804 | 1490 | |
| F | % | | | 0.15 |
| $C_{tot}$ | % | | | 0.02 |

The final weight of the calcine was less than 10 g. This made it difficult to accurately analyse the final product. Both ICP and XRF analytical techniques were used and gave some variation in the individual rare earth values. The results illustrate a variety of characteristics:

1. The calcine is generally very low in contamination and mostly consists of rare earth oxides.
2. The thorium content of the precipitate was 3.6 g/t and the calcine was reported at 6.5 g/t Th by ICP. This is an exceptionally low value for a rare earth oxide.
3. The uranium content of the calcine is <50 g/t.
4. The aluminum and iron values are suitably low at 146 and 9 g/t in the precipitate. The iron in the calcine was analyzed by ICP at 744 g/t.
5. Minor amounts of alkali, alkaline earth and base metals are present.
6. The F content at 0.15% may be minimized by more selective oxalate precipitation.
7. The total carbon content was very low at 0.02% indicating that the calcination was complete.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

REFERENCES

Srivastava, R. M., Gauthier, J., Cox, J., Krutzelmann, H. (2013), Technical Report on the Foxtrot Project in Labrador, Newfoundland and Labrador Canada (Report NI 43-101), Toronto, ON.

Srivastava, R. M., & Gauthier, J. (2012). Search Minerals Inc. Technical Report on the Foxtrot Project in Labrador, Newfoundland and Labrador Canada. (Report NI 43-101). Toronto, ON: Roscoe Postle Associates Inc.

Dreisinger, D. B., Clucas, J. D., Verbaan, N., Grammatikopoulos, T., Aghamirian, M., Forstner, C., "The Processing of REE's from Search Minerals Foxtrot Resource", Proceedings of Rare Earths 2012, Eds, J. R. Goode, G. Moldoveanu, M. S. Reyat, CIM Metsoc (Montreal), 81-94.

The invention claimed is:

1. A process for extracting rare earth elements from an ore, comprising:
   crushing the ore to a coarse particle size of greater than 10 mesh, to provide a crushed ore;
   subjecting the crushed ore to an acid treatment, to provide an acid treated ore;
   subjecting the acid treated ore to a water leach, to produce a weakly acidic product leach solution;
   subjecting the weakly acidic product leach solution to oxidation and pH adjustment to precipitate an iron and thorium-containing precipitate from the solution;
   separating the weakly acidic product leach solution from the iron and thorium-containing precipitate, to provide a treated leach solution; and,
   adding sodium carbonate to the treated leach solution to precipitate a mixed carbonate rare earth product.

2. The process of claim 1, wherein the acid treatment is application of from about 50 to about 150 kg/t of $H_2SO_4$ at from about 100° C. to 300° C. for about 1 to 3 hours.

3. The process of claim 1, wherein the water leach is for at least 5, 10, 15, 20 or 24 hours.

4. The process of claim 1, wherein the acid treatment is carried out in a heated pug mill or a series of heated pug mills.

5. The process of claim 1, further comprising one or more steps of:
   ore/acid mixing, ore/acid heating, ore/acid drying, and/or ore/acid holding for a reaction time at a reaction temperature;
   so as to render additional rare earth elements soluble in a subsequent water leach step.

6. The process of claim 1, wherein the oxidation and pH adjustment is carried out with a $MgCO_3$, MgO, NaOH, $Na_2CO_3$, $NH_3$, $NH_4OH$ or $NaHCO_3$.

7. The process of claim 1, further comprising re-leaching the mixed carbonate rare earth product with a re-leaching acid to produce a strong rare earth chloride solution.

8. The process of claim 7, wherein the re-leaching acid is HCl, $HNO_3$ or $H_2SO_4$ at pH 1 or less.

9. The process of claim 7, further comprising increasing the pH of the strong rare earth chloride solution with a titrating base so as to precipitate thorium and other impurities, to produce a base-treated strong rare earth chloride solution.

10. The process of claim 9, wherein the titrating base is MgO, NaOH, $Na_2CO_3$, $NH_3$, $NH_4OH$ or $NaHCO_3$.

11. The process of claim 9, wherein rare earths are re-precipitated from the base-treated strong rare earth chloride solution with addition of a re-precipitation acid, to produce a high quality mixed rare earth acid precipitate.

12. The process of claim 11, wherein the re-precipitation acid is oxalic acid, and the mixed rare earth acid precipitate is an oxalate.

13. The process of claim 11, wherein the mixed rare earth acid precipitate is calcined.

14. The process of claim 13, wherein the calcining is carried out at at least 750° C., to produce a high quality mixed rare earth oxide product.

15. The process of claim 14, wherein the high quality mixed rare earth oxide product is re-leached with refinery re-leaching acid to produce a high strength rare earth solution.

16. The process of claim 15, wherein the high strength rare earth solution is treated by multi-stage solvent extraction for rare earth separation.

17. The process of claim 15, wherein the refinery re-leaching acid is HCl, $HNO_3$ or $H_2SO_4$.

18. The process of claim 1, wherein the ore is crushed to a coarse particle size of greater than 6 mesh, to provide the crushed ore.

19. The process of claim 1, wherein the recovered rare earth elements comprise at least two of: La, Ce, Pr, Nd, Sm, Eu, Gd, Tb, Dy, Ho, Y, Er, Tm, Yb and Lu.

20. The process of claim 19, wherein the overall recovery of La, Ce, Pr, Nd, Sm, Eu, Gd, Tb, Dy, Ho, Y or Er is at least about 70%.

21. The process of claim 19, wherein the overall recovery of Tm is at last about 65%.

22. The process of claim 19, wherein the overall recovery of Yb is at least about 60%.

23. The process of claim 19, wherein the overall recovery of Lu is at least about 50%.

24. The process of claim 1, wherein the recovered rare earth elements include: La, Ce, Pr, Nd, Sm, Eu, Gd, Tb, Dy, Ho, Y, Er, Tm, Yb and Lu.

25. The process of claim 19, wherein the acid treatment and the water leach are carried out so as to minimize the addition of acid while obtaining the recovered rare earth elements.

* * * * *